March 9, 1971  B. HUTTER  3,568,313
ELECTRIC SHAVER

Filed May 5, 1969  2 Sheets-Sheet 1

INVENTOR:
BEDA HUTTER
BY Robert K...

March 9, 1971 B. HUTTER 3,568,313
ELECTRIC SHAVER

Filed May 5, 1969 2 Sheets-Sheet 2

INVENTOR:
BEDA HUTTER
BY Robert H. Hurst

United States Patent Office 3,568,313
Patented Mar. 9, 1971

3,568,313
ELECTRIC SHAVER
Beda Hutter, Rorschacherberg, Switzerland, assignor to August Belz, Goldach, Switzerland
Filed May 5, 1969, Ser. No. 821,747
Claims priority, application Switzerland, May 29, 1968, 7,997/68
Int. Cl. B26b 19/14
U.S. Cl. 30—43.6
8 Claims

ABSTRACT OF THE DISCLOSURE

Battery-operated shaver comprises a two-part electrically conductive housing through which the circuit is closed by a spring contact that is free to move against one housing part when the cap is removed or, in a second embodiment, a ring is turned.

BACKGROUND OF THE INVENTION

The invention relates to a dry shaver, including a shearing head, a cutter head incorporated by the latter, an electric motor for driving the cutter head, a compartment for holding a battery for powering the electric motor, and a switch for opening and closing the electric circuit of which the motor and battery form a part.

In known shavers of this kind the switch is relatively complicated in design, consisting, for example, of a multipart toggle switch or of a slider switch operated by the removing and putting on of a cap. Both designs have not only the disadvantage that they are relatively expensive, which is of great consequence when the shavers are mass produced, but also the disadvantage that the large number of points of contact, required both within the switch and in the connections between the switch and the motor and the battery, result in a substantial loss of power during operation of the shaver.

SUMMARY OF THE INVENTION

An object of the invention is an improved shaver of the aforesaid kind that incorporates a switch that is relatively simple, inexpensive, and free of power losses.

This object and others of the invention will be apparent from the following detailed description of two embodiments.

BRIEF DESCRIPTION OF THE DRAWINGS

The invention will be described, with reference to the figures of the drawings, wherein.

DESCRIPTION OF THE PREFERRED EMBODIMENTS

Figure 1:
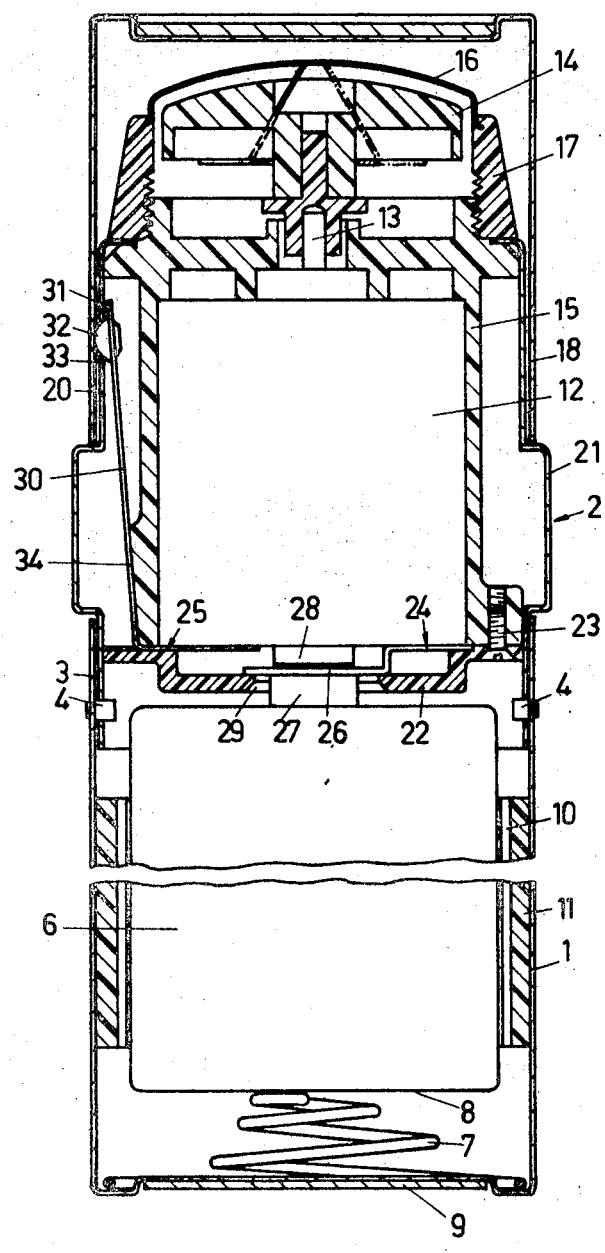
FIG. 1 is a longitudinal section of a first embodiment.
Figure 2:
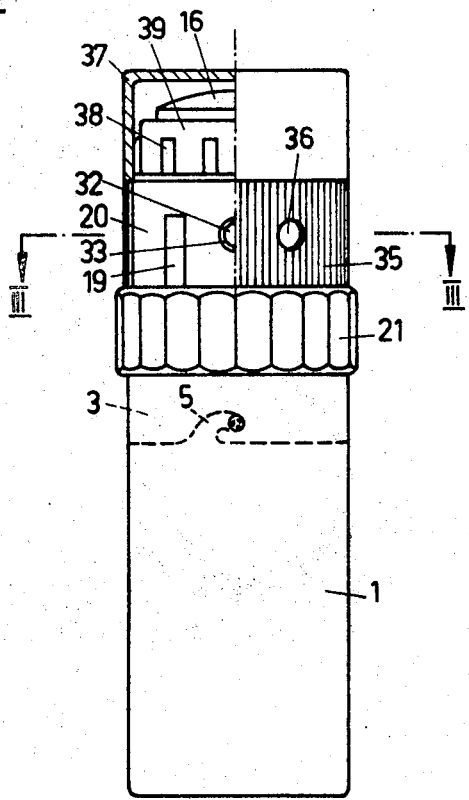
FIG. 2 is a side view, partly cut away, of a second embodiment.

With reference to FIG. 1, the electric shaver comprises a cylindrical battery compartment 1 made of a good electrically conductive material. A housing 2, also made of a good electrically conductive material, is mounted on the battery compartment. The lower end 3 of the housing 2 fits inside the compartment 1, to which it is connected by a bayonet catch, the compartment 1 and housing 2 being in continuous electrical connection. This catch incorporates two oppositely disposed pins 4, which each cooperate in the usual way with a respective slot 5 of the housing end 3, as shown in FIG. 2. The embodiments illustrated in FIGS. 1 and 2 are nearly the same, except in those respects to be explained later in connection with FIGS. 2 and 3.

The compartment 1 holds a battery 6 supported by a compression spring 7, which electrically connects the lower pole 8 of the battery to the bottom 9 of the compartment. A synthetic-plastic liner 11, provided with vertical ribs 10, positions the battery centrally within the compartment. The housing 2 holds a motor-housing 15 that in turn holds an electric motor 12 having a shaft 13 that carries a conventional rotary cutter head 14, which is only schematically illustrated. Screwed onto the motor housing 15 is a ring 17 with a thin comb 16. When the shaver is put away, the shearing head thus constructed of the parts 14, 16, and 17 is covered by a cylindrical cap 18, which is slipped onto the upper end 20 of the housing 2, this end having ribs 19 (see FIG. 2) to provide the necessary friction to ensure that the cap is held in place. The housing embodies a fluted, radially-projecting and ring-shaped middle part 21, which serves as a hand grip and as a stop for the battery compartment 1 and the cap 18.

Two spring contacts 24, 25, forming the terminal posts of the motor 12, are tightly clamped between the motor housing 15 and a cover 22, which is fixed to the housing 15 by screws 23. The contact 24, which has two bends, comprises at the shaver axis a portion 26, which the upper projecting pole 27 of the spring-supported battery 6 pushes against a projection 28 of the motor 12. This projection acts as a stop, and the battery pole 27 extends through an opening 29 in the cover 22. The contact 25 embodies an upwardly bent leg 30 outside of the motor housing 15. This leg carries near its free upper end 31 a rivet 32 made of an electrically insulating synthetic plastic. The rivet 32 projects through an opening 33 in the upper end 20 of the housing 2 and is pressed by the tension in the spring contact 25 against the cap 18, thereby preventing the contact upper end 31 from touching the housing 2.

The parts 18, 20, 31, and 32 can be considered a switch of which the operating member is the cap 18. When the cap is removed from the end 20, the contact end 31 moves against the housing 2, closing the circuit 26, 24, 12, 25, 30, 31, 2, 1, 9, 7, 8, and 6 through the battery 6 and the motor 12, and turning on the latter. When the cap 18 is again slipped on, the motor is automatically shut off.

Part of the leg 30 of the contact 25 presses against a taper 34 of the motor housing 15. This measure, which is not essential, increases the force with which the contact 25 presses the rivet 32 outwards. Nor is it essential to provide a stop 28 above the portion 26 of the spring contact 24. Even the contact 24 can be eliminated, provided that the central projection 28 of the motor 12 serves in its place as one terminal post for the motor.

Figure 3:
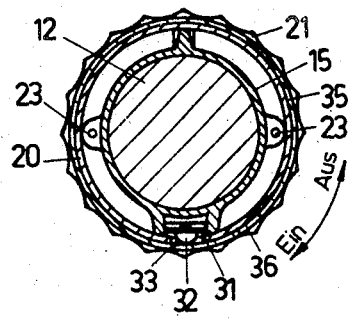
FIG. 3 is a view in cross section taken along line III—III of FIG. 2.

The embodiment illustrated in FIGS. 2 and 3 differs from the preceding one in providing a fluted ring 35, rotatalby mounted on the upper end 20 of the housing 2, for turning the motor on and off. The ring 35 embodies an opening 36, which can be aligned with the opening 33 by turning the ring. When the opening 36 is thus aligned, the insulating rivet 32 is free to move outwards, the contact end 31 touching the housing upper end 20 and turning on the motor 12. This embodiment also comprises a cap 37, which, however, is not slipped onto the end 20 but instead onto a shearing head ring 39 that embodies ribs 38 for securely holding the cap in place. The ribs 19, which are too short to be seen in FIG. 3, advantageously cooperate with corresponding pins (not shown) on the ring 35 to constitute a click stop, for the purpose of preventing the ring from being rotated to turn the motor on or off unintentionally.

Although the preferred embodiments of the invention

What is claimed is:

1. A dry shaver, including a shearing head, a cutter head incorporated by said shearing head, an electric motor for driving said cutter head, a compartment for holding a battery for powering said electric motor, and a switch for opening and closing the electric circuit of which said motor and battery form a part, and wherein the improvement comprises that said switch includes a spring contact (25) that serves as a first terminal of said motor, said spring contact embodying a free end (31) under constant spring tension to move in a given direction, an electrically insulating member (32) carried by said spring contact near said free end thereof, an electrically conductive housing part (20), a second terminal (24) for said motor continuously electrically connected to said housing part through said battery, an opening (33) in said housing part through which said insulating member extends for permitting said contact free end to move in the given direction towards and against said housing part, an operating member (18, 35) for opening and closing said switch and which when said switch is open cooperates with said insulating member to prevent said contact free end from moving against said housing part, and which when said switch is closed permits said insulating member to project farther through said opening and said contact free end to touch said housing part, whereby the electric circuit is closed.

2. The shaver as defined in claim 1, wherein said operating member is a cap for covering the shearing-head end of the shaver, said cap cooperating with said housing part to be slipped onto and off of the latter for opening said switch when slipped on and closing said switch when slipped off, automatically.

3. The shaver as defined in claim 1, wherein said operating member is a ring surrounding and rotatably mounted on said housing part, and an opening (36) in said ring which can be brought into and out of registry with said housing-part opening for respectively turning said motor on and off.

4. The shaver as defined in claim 2, wherein the shaver defines a longitudinal axis, said battery compartment is electrically conductive, and said motor second terminal includes a portion (26) at the said shaver axis, and further including resilient means (7) for pressing one pole of said battery against said second terminal portion and for providing a continuous electrical connection between the other battery pole and said battery compartment, and a housing (2) that incorporates said housing part and is in continuous and breakable electrical connection with said battery compartment.

5. The shaver as defined in claim 3, wherein the shaver defines a longitudinal axis, said battery compartment is electrically conductive, and said motor second terminal includes a portion (26) at the said shaver axis, and further including resilient means (7) for pressing one pole of said battery against said second terminal portion and for providing a continuous electrical connection between the other battery pole and said battery compartment, and a housing (2) that incorporates said housing part and is in continuous and breakable electrical connection with said battery compartment.

6. The shaver as defined in claim 4, wherein said motor second terminal comprises a doubly bent spring contact, and further including a stop projection (28) incorporated by said motor at said shaver axis for supported said second terminal portion against the pressure of the one pole of said battery.

7. The shaver as defined in claim 5, where said motor second terminal comprises a doubly bent spring contact, and further including a stop projection (28) incorporated by said motor at said shaver axis for supporting said second terminal portion against the pressure of the one pole of said battery.

8. The shaver as defined in claim 3, including a click stop for preventing accidental movement of said ring from its closed- and open-circuit positions.

References Cited

UNITED STATES PATENTS

| | | | |
|---|---|---|---|
| 2,700,215 | 1/1955 | Elsky | 30—43.6 |
| 3,403,440 | 10/1968 | Omori et al. | 30—43.6 |

TRAVIS S. McGEHEE, Primary Examiner

U.S. Cl. X.R.

30—42